US006828932B1

(12) United States Patent
Jenabi

(10) Patent No.: US 6,828,932 B1
(45) Date of Patent: Dec. 7, 2004

(54) SYSTEM FOR RECEIVING MULTIPLE INDEPENDENT RF SIGNALS HAVING DIFFERENT POLARIZATIONS AND SCAN ANGLES

(75) Inventor: Masud Jenabi, Rancho Palos Verdes, CA (US)

(73) Assignee: ITT Manufacutring Enterprises, Inc., Wilmington, CA (US)

( * ) Notice: Subject to any disclaimer, the term of this patent is extended or adjusted under 35 U.S.C. 154(b) by 108 days.

(21) Appl. No.: 10/346,231

(22) Filed: Jan. 17, 2003

(51) Int. Cl.[7] .......... G01S 7/285

(52) U.S. Cl. .......... 342/188; 342/157; 342/158; 342/174; 342/372

(58) Field of Search .......... 342/13, 21, 157, 342/158, 174, 188, 368, 371, 372, 373, 374, 375; 343/700 MS; 455/276.1, 278.1, 304, 305

(56) References Cited

U.S. PATENT DOCUMENTS

| | | | | |
|---|---|---|---|---|
| 3,836,973 A | | 9/1974 | Shnitkin et al. | |
| 4,021,813 A | | 5/1977 | Black et al. | |
| 4,771,294 A | | 9/1988 | Wasilousky | |
| 4,939,527 A | | 7/1990 | Lamberty et al. | |
| 4,952,894 A | | 8/1990 | Connerney et al. | |
| 5,019,829 A | | 5/1991 | Heckman et al. | |
| 5,083,132 A | | 1/1992 | Kanda et al. | |
| 5,109,232 A | | 4/1992 | Monte | |
| 5,162,803 A | | 11/1992 | Chen | |
| 5,276,455 A | | 1/1994 | Fitzsimmons et al. | |
| 5,592,177 A | | 1/1997 | Barrett | |
| 5,724,044 A | | 3/1998 | Tanaka | |
| 5,886,671 A | | 3/1999 | Riemer et al. | |
| 5,936,588 A | | 8/1999 | Rao et al. | |
| 6,020,848 A | | 2/2000 | Wallace et al. | |
| 6,054,948 A | | 4/2000 | Dean | |
| 6,114,997 A | | 9/2000 | Lee et al. | |
| 6,198,449 B1 | | 3/2001 | Muhlhauser et al. | |
| 6,208,312 B1 | | 3/2001 | Gould | |
| 6,574,021 B1 | * | 6/2003 | Green et al. | 342/157 |
| 6,650,291 B1 | * | 11/2003 | West et al. | 342/371 |
| 6,658,234 B1 | * | 12/2003 | Dogan et al. | 342/373 |
| 6,768,458 B1 | * | 7/2004 | Green et al. | 342/375 |
| 2003/0067410 A1 | * | 4/2003 | Puzella et al. | 343/700 MS |

FOREIGN PATENT DOCUMENTS

| | | |
|---|---|---|
| EP | 0 620 613 A2 | 10/1994 |
| EP | 0 621 654 A2 | 10/1994 |
| EP | 0 665 607 A1 | 2/1995 |

* cited by examiner

*Primary Examiner*—John B. Sotomayor
(74) *Attorney, Agent, or Firm*—Freilich, Hornbaker & Rosen

(57) ABSTRACT

A wideband receiver system capable of simultaneously receiving multiple independent RF input signals from different sources which signals can be polarized (linearly or circularly) differently and exhibit different scan angles.

20 Claims, 4 Drawing Sheets

SYSTEM FOR RECEIVING MULTIPLE INDEPENDENT RF SIGNALS HAVING DIFFERENT POLARIZATIONS AND SCAN ANGLES

This invention was made under Government Contract N00178-99-9-9001.

FIELD OF THE INVENTION

This invention relates generally to active array RF systems and more particularly to a receiver capable of simultaneously receiving N independent RF input signals, which can respectively have different, scan angles and be circularly or linearly, polarized.

BACKGROUND OF THE INVENTION

The prior art describes various active array RF systems useful in a wide range of military and commercial applications for handling circularly and/or linearly polarized signals. For example only, U.S. Pat. No. 6,020,848 describes a phased array antenna system that allows reception of electrically selectable single polarity or simultaneous dual polarity/dual beam signals.

SUMMARY OF THE INVENTION

The present invention is directed to a wideband receiver system capable of simultaneously receiving multiple independent polarized (linearly or circularly) RF input signals from multiple sources within a wide scan angle range. Embodiments of the invention are suitable for a wide range of military and commercial application. The exemplary embodiment described herein is particularly suited for receiving input signals within the X/Ku band, e.g., between 10.9 and 15.35 Ghz.

A preferred receiver in accordance with the invention utilizes first and second linear orthogonal radiators for respectively receiving composite signals $RF_X$ and $RF_Y$. Each of the composite signals can contain multiple independent RF input signals, e.g., F1 at a frequency of $f_1$, F2 at a frequency of $f_2$, . . . FN at frequency fN. The composite signals, $RF_X$ and $RF_Y$, are respectively divided into multiple components, e.g., (where N=4) $RF_{X1}$, $RF_{X2}$, $RF_{X3}$, $RF_{X4}$ and $RF_{Y1}$, $RF_{Y2}$, $RF_{Y3}$, $RF_{Y4}$. The $RF_X$ and $RF_Y$ components are then uniquely paired and processed in a polarization compensation stage by selective phase shifting based on the known polarization (e.g., left hand circular, right hand circular, linear 0–90°/180°–270°, and linear 90°–180°/270°–360°) of the signals to be received to produce four coherent signals, i.e., $RF_{XY1}$, $RF_{XY2}$, $RF_{XY3}$, $RF_{XY4}$. These four coherent signals are then selectively phase shifted in a scan angle compensation stage to recover the input signals F1, F2, F3, F4. The recovered input signals are then preferably band pass filtered.

More particularly, in a preferred embodiment, the composite signal $RF_X$ is applied to a four way divider which produces the four signals components $RF_{X1}$, $RF_{X2}$, $RF_{X3}$, $RF_{X4}$. Similarly, the composite signal $RF_Y$ is applied to a four way divider to produce the signal components $RF_{Y1}$, $RF_{Y2}$, $RF_{Y3}$, $RF_{Y4}$. Each signal component contains contributions from the four input signals F1, F2, F3, F4. The $RF_X$ signal components are then respectively passed through controllable 90° phase shift branches and the $RF_Y$ signal components are respectively passed through controllable 180° phase shift branches. The output of each 90° phase shift branch is uniquely paired with an output from a 180° phase shift branch and then summed in one of four two-way combiners to produce a coherent output. The 90° and 180° phase shift branches are digitally controlled to define a desired polarization angle, i.e., right hand circularly polarized, left hand circularly polarized, or linearly polarized, for each branch pairing. The following table describes an exemplary two bit control of the polarization phase shifters for each branch pairing for each polarity condition:

| POLARITY | 90° shifter | 180° shifter |
|---|---|---|
| Right Hand Circular | ON | OFF |
| Left Hand Circular | ON | ON |
| Linear 0°–90°/180°–270° | OFF | OFF |
| Linear 90°–180°/270°–360° | OFF | ON |

The coherent outputs of the four two-way combiners, each containing the input signals F1, F2, F3, F4, are then respectively applied to four digitally controlled phase shifters to compensate for scan angle. More particularly, the output of the first two-way combiner processing signals $RF_{X1}$ and $RF_{Y1}$ is applied to a first phase shifter which is digitally controlled to define the scan angle of the input signal F1. Similarly, the outputs of the second, third and fourth two-way combiners are respectively applied to the second, third and fourth phase shifters which are respectively digitally controlled to define the scan angles of signals F2, F3, F4. The outputs from the scan angle phase shifters, which comprise the received input signals F1, F2, F3, F4, are then preferably passed through band filters respectively tuned to f1, f2, f3, f4. A preferred implementation of a receiver in accordance with the invention utilizes multiple substrates configured for stacking into a compact substrate assembly. The preferred substrate assembly includes six substrates or layers configured as follows:

Layer 1=Radiator/Balun Substrate
Layer 2=Low Noise Amplifier (LNA) Substrate
Layer 3=First Circular/Linear Polarization Control Substrate
Layer 4=Second Circular/Linear Polarization Control Substrate
Layer 5=Scan Control Substrate
Layer 6=Regulator Substrate The substrates are connected vertically preferably using fuzz-button interconnects, and caged via hole technology.

The preferred substrate assembly comprises a sixteen channel device. That is the Radiator/Balun substrate forms a sixteen element matrix in which each element contains orthogonally polarized radiators for supplying composite signals $RF_X$ and $RF_Y$. Each element is coupled through the layers of the stack assembly forming the aforediscussed receiver to recover four input signals F1, F2, F3, F4

DETAILED DESCRIPTION

Figure 1:
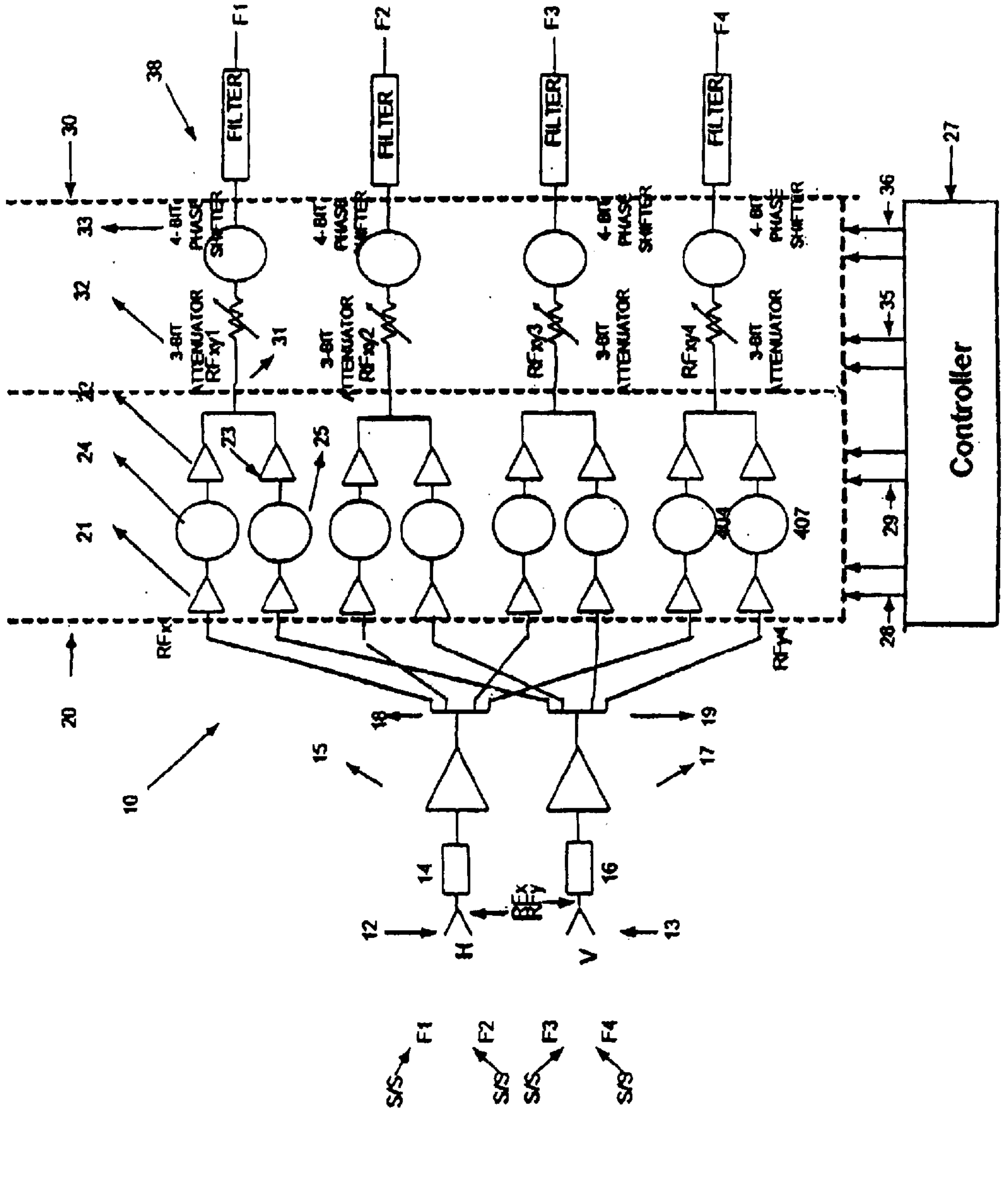
FIG. 1 is a block diagram depicting the architecture of a receiver in accordance with the present invention.

Attention is initially directed to FIG. 1 which generally depicts a receiver 100 in accordance with the invention for simultaneously receiving multiple independent RF input signals. The exemplary multiple input signals are represented in FIG. 1 as F1, F2, F3, F4 and are shown as emanating from respective independent signal sources (s/s). The characteristics of the signal sources can vary widely depending on the application of the receiver 100. For example, the signal sources can be satellite based for use in a variety of commercial and direct-to-home systems for transferring broadcast television and/or internet and/or data signals. In other applications, the signal sources can comprise aircraft, ships, and land based stations for providing communication therebetween.

The input signals F1, F2, F3, F4, to be discussed herein will be presumed to be operating at frequencies f1, f2, f3, f4, respectively. Each independent input signal will also be presumed to be polarized, either linearly or circularly (right hand or left hand) and to be directed at a known scan angle relative to the receiver 10. The intended function of the receiver 10 is to be able to simultaneously receive multiple input signals despite their exhibiting different scan angles and polarizations. A receiver in accordance with the invention will herein be described with reference to a preferred embodiment intended to handle received input signals in the 10.9 to 15.35 GHz range wherein each input signal can be circularly or linear polarized and can exhibit a scan angle within a range −45° to +45° relative to the receiver.

The receiver 10 is comprised of a first radiator 12 and a second radiator 13 mounted orthogonal to one another. The radiators 12 and 13 respectively yield composite output signals $RF_X$ and $RF_Y$ in response to the signal energy incident on the radiators. Thus the composite signals $RF_X$ and $RF_Y$ each contain contributions from input signals F1, F2, F3, F4. As shown in FIG. 1, the composite signal $RF_X$ is applied through a balun 14 to a low noise amplifier 15. Similarly the composite signal $RF_Y$ is applied through a balun 16 to a low noise amplifier 17. The output of low noise amplifier 15 is applied to divider circuit 18 which produces four substantially equal component signals $RF_{X1}$, $RF_{X2}$, $RF_{X3}$, $RF_{X4}$. Similarly, the output of low noise amplifier 17 is coupled through divider circuit 19 to produce four substantially equal component signals $RF_{Y1}$, $RF_{Y2}$, $RF_{Y3}$, $RF_{Y4}$. The $RF_X$ and $RF_Y$ component signals are all applied to the input of a polarity compensation stage 20.

The polarity compensation stage 20 is comprised of multiple channels or branch pairs. Each branch pair 21 includes a 90° phase shift branch 22 and a 180° phase shift branch 23. More particularly, note in FIG. 1 that the $RF_X$ components supplied by divider 18 are respectively applied to different 90° phase shift branches 22 within the polarity compensation stage 20. Each 90° phase shift branch 22 is depicted as including a digitally controllable 90° phase shifter 24 and one or more amplifier stages. Similarly, the component outputs from divider 19 are respectively applied to different 180° phase shift branches 23, each branch including a digitally controllable 180° phase shifter 25 and one or more amplifier stages.

A digital controller 27 is provided for selectively controlling the states (i.e., on/off) of each of the phase shifters 24, 25 in the polarity compensation stage 20. Thus, for example, four bits (output 28) respectively control the four 90° phase shifters 24. Similarly, four bits (output 29) respectively control the four 180° phase shifters 115. Polarity compensation is effected in each branch pair accordance with the following table:

| POLARITY | 90° shifter | 180° shifter |
|---|---|---|
| Right Hand Circular | ON | OFF |
| Left Hand Circular | ON | ON |
| Linear 0°–90°/180°–270° | OFF | OFF |
| Linear 90°–180°/270°–360° | OFF | ON |

Operation in accordance with the foregoing table enables the polarity compensation stage 20 to phase align paired $RF_X$ and $RF_Y$ component signals to produce coherent output signals $RF_{XY1}$, $RF_{XY2}$, $RF_{XY3}$, $RF_{XY4}$ from the respective branch pairs. Each branch pair output signal constitutes the sum of respective branch signals. These coherent branch pair output signals are then applied to different channels of a scan angle compensation stage 30.

The scan angle compensation stage 30 is depicted as being comprised of four channels, each channel 31 being comprised of a digitally controllable attenuator 32 connected in series with a digitally controllable phase shifter 33.

A twelve bit controller output (i.e., three bits per channel) 35 controls the four attenuators 32. The attenuators function to balance the amplitudes on the multiple channels of compensation stage 30.

A sixteen bit controller output 36 (i.e., four bits per channel) controls the phase shifters 33 to define a scan angle for each channel. Typically, each coherent signal, e.g., $RF_{XY1}$, applied to the scan angle compensation stage 30 will contain a dominant input signal dependent upon the angle of incidence of the input signal energy on the radiators.

Thus, it should now be understood how the polarity compensation stage 20 and the scan angle compensation stage 30 together process the composite signals supplied by the radiators 12 and 13 to recover the input signals F1, F2, F3, F4 at the outputs of the phase shifters 33. The outputs from the phase shifters 33 are preferably respectively directed through band pass filters 38 respectively tuned to the input signal frequencies, i.e., f1, f2, f3, f4.

Figure 2:
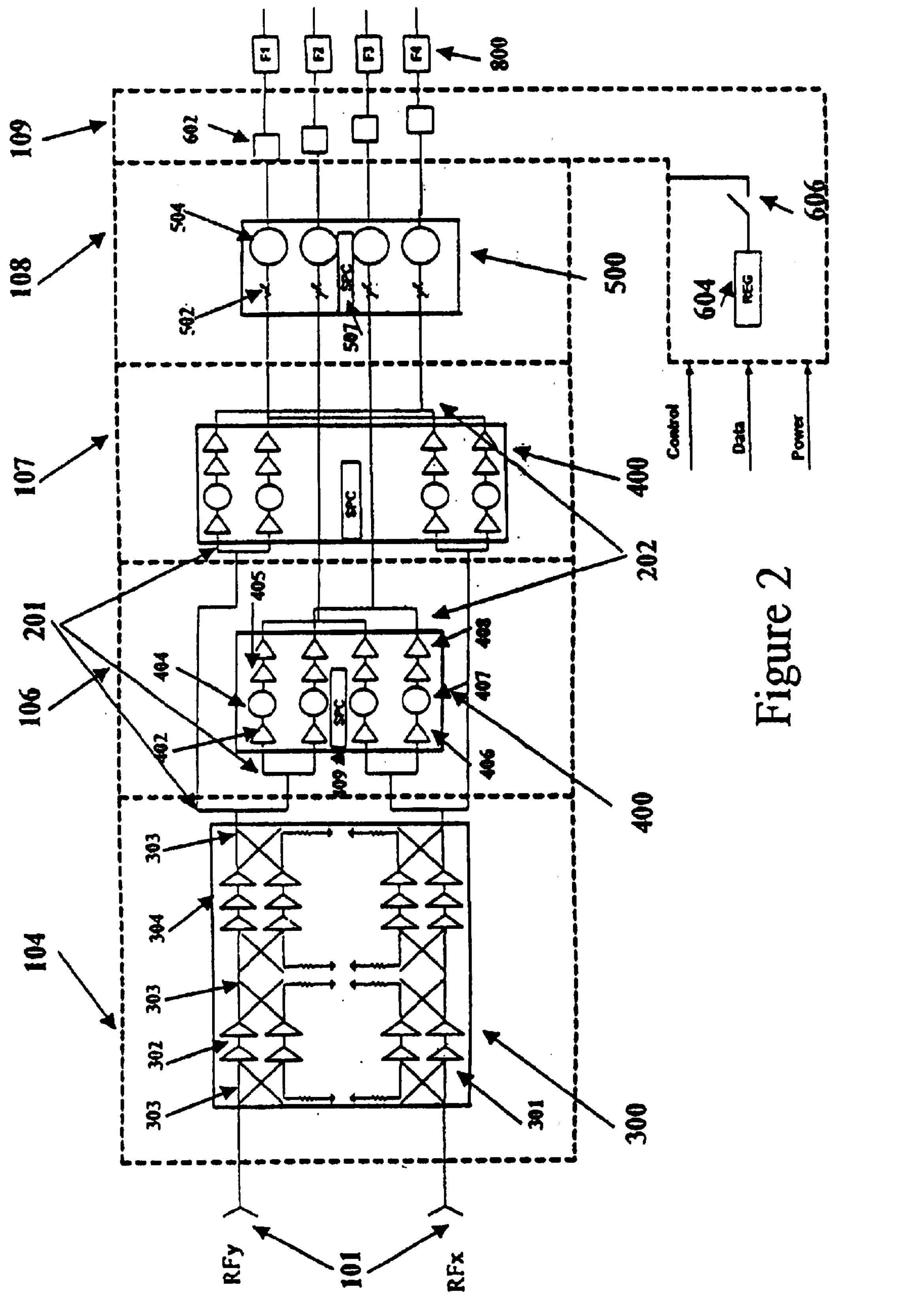
FIG. 2 is a block diagram showing a preferred electronic implementation of the receiver architecture of FIG. 1.
Figure 3:
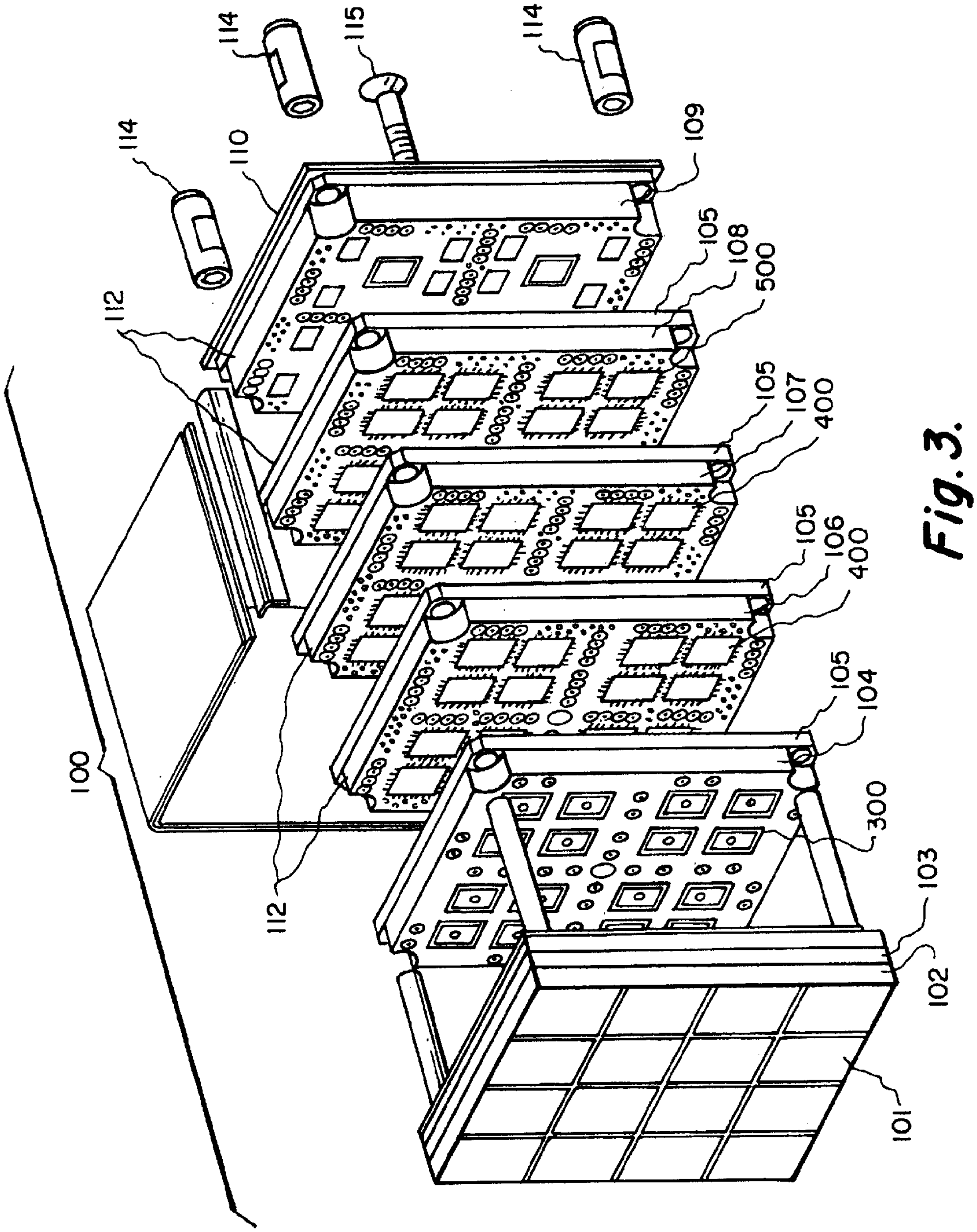
FIG. 3 is an exploded isometric illustration of a stack assembly implementing sixteen channels of an active array RF system where each channel can receive four independent RF input signals.

Attention is now directed to FIG. 3 which illustrates a preferred structural implementation of the invention which comprises a sixteen channel substrate assembly 100 (sometimes called "Receive Tile") for use in an active phased array antenna system for receiving four simultaneous input signals within the X/Ku band which can exhibit various scan angles and be variously polarized. FIG. 2 is a block diagram illustrating the functional circuitry for a single channel of the assembly 100.

Figure 4:
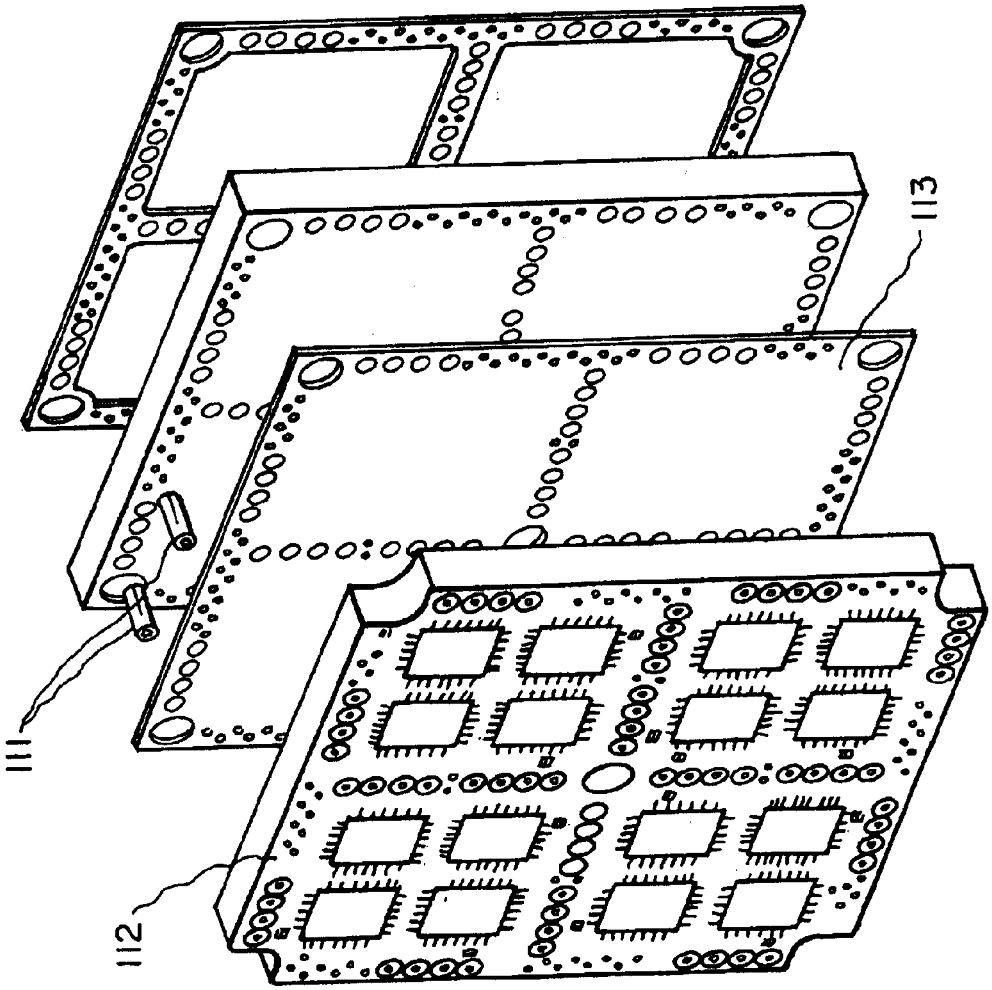
FIG. 4 is an exploded isometric illustration of an exemplary layer of the stack assembly of FIG. 3.

The substrate assembly 100 shown in FIG. 3 is comprised of six substrates or layers, that are stacked on top of one another. An exploded view of a single exemplary substrate is shown in FIG. 4. These substrates technology to form the assembly 100. The top substrate layer comprises a matrix 101 of sixteen radiator elements mounted adjacent to a balun substrate 102. Each radiator element includes two orthogonal polarized square patch radiators. Each pair of orthogonal radiators makes possible the reception of variously polarized signals as described in connection with FIG. 1. The radiator matrix 101 is attached to the balun substrate 102 which preferably comprises a multilayer LTCC substrate. The balun substrate 102 is attached to an aluminum-graphite frame 103, e.g., by film epoxy 113 (FIG. 4). The frame 103 supports the Fuzz-button interconnects 111 and enables vertical connection between the multiple substrates. The Fuzz-button interconnects 111 support the propagation of RF, DC and digital signals between the substrates.

Below the radiator/balun substrate layer is a low noise amplifier (LNA) substrate 104. This multilayer LTCC substrate has a strip line and a two-way divider 201 (FIG. 2) for inputting and outputting RF signals, respectively, to and from the low noise amplifier chip 300. Sixteen low noise amplifier chips 300 are installed in the substrate 104. The LNA chips are connected to the strip line and output divider by caged via holes 112 and strip lines. The DC signals are also delivered to the chip by the caged via holes.

Each pair of orthogonal radiators of matrix 101 responds to incident signal energy by feeding the aforediscussed composite signals $RF_X$ and $RF_Y$ to a low noise amplifier chip 300. The outputs of the low noise amplifier chip are connected to a strip line divider 201 that divides the signal into two substantially equal component signals. The LNA chip 300 comprises a two-channel amplifier. Each channel is a five stage balanced low noise amplifier 301 that operates in 9.75 to 15.35 GHz frequency range. Each channel consists of a two stage low noise amplifier 302 with two Lang couplers 303 at input and output and a three stage buffer amplifier 304 with two Lang couplers 303 at input and output. The low noise amplifier chip 300 provides amplification for the composite input signals $RF_X$ and $RF_Y$ from the radiators to maintain the active array's low noise figure, high input return loss and wide bandwidth. The LNA substrate 104 is attached to an aluminum-graphite frame 105 using film epoxy 113. The substrate 104 is then connected to the radiator/balun substrate 102 via Fuzz-button interconnection 111.

The assembly 100 further includes a first circular/linear polarization substrate 106 interconnected below the LNA substrate 104. This multi-layer LTCC substrate 106 has a two-way divider 201 and a two-way combiner 202 for inputting and outputting RF signals, respectively, to and from a circular/linear polarization chip 400 in substrate 106. Sixteen chips 400 are installed in the circular/linear polarization substrate 106. These chips are connected to the input divider 201 and output combiners 202 via caged via holes 112 and strip lines. DC and digital signals are also delivered to the chip by the caged via holes.

Each input divider on substrate 106 divides an output signal from the LNA substrate 104 to produce substantially equal component signals which are fed to the circular/linear polarization chip 400. Each of the chips 400 includes digitally (one bit) controllable 90° phase shifters and digitally (one bit) controllable 180° phase shifters, as described in connection with FIG. 1. Each of the chips 400 also includes a serial to parallel converter (SPC) for converting a serial control stream to parallel control bits for controlling the phase shifters. The SPC devices are preferably implemented by gallium arsenide (GaAs) technology and integrated into the chip design. The integration of digital and RF circuits on the chips 400 enables the realization of high performance within a very compact physical package. The output combiners 202 on substrate 106 combine the output signals from the circular/linear polarization (CP/LP) chip 400. The substrate 106 is attached to an aluminum-graphite frame 105 using film epoxy 113.

The CP/LP chip 400 is a four-channel receiver chip that is capable of simultaneously receiving two linearly or circularly polarized signals. Each of channels one and two consists of a two-stage amplifier 403, a 90° phase shift 404, and a one stage amplifier 405. Each of channels three and four consists of a two-stage amplifier 406, 180° phase shift 407, and a one stage amplifier 408. The four bit digital serial to parallel converter 409 uses three TTL signals to control the phase shifters bits that control the polarization angles of the received signals. Channels one and three receive the linear and orthogonal components of the first signal applied to chip 400. Channels two and four receive the linear and orthogonal components of the second signal applied to chip 400. The amplifier stages provide amplification for incoming signals. The control bits controlling of the 180° and 90° phase shifts enable phase alignment of the differently polarized received signals, as described in the previously presented table.

Below the first circular/linear polarization substrate 106 is a second circular/linear polarization substrate 107. The substrate 107 is substantially identical to substrate 106 and includes a two-way divider 201 and a two-way combiner 202 for inputting and outputting RF signals, respectively, to and from its circular/linear polarization chip 400. Sixteen chips 400 are installed in the circular/linear polarization substrate 107. It should be understood from FIG. 2 and the earlier discussion of FIG. 1 that substrate 106 produces coherent signals $RF_{XY2}$ and $RF_{XY3}$ and substrate 107 produces coherent signals $RF_{XY1}$ and $RF_{XY4}$.

Below the circular/linear polarization substrate 107 is the scan substrate 108. This multilayer LTCC substrate has strip lines for inputting and outputting RF signals to and from the scan chips 500. Sixteen scan chips 500 are installed in the scan substrate 108. These chips are connected to the input and output strip lines via caged via holes 112 and strip lines. The DC and digital signals are also delivered to the chip 500 by the caged via holes. The four coherent output signals produced by the circular/linear polarization substrates 106, 107 are fed to the scan chip 500. Each of the scan chips 500 is comprised of four channels 501 where each channel includes a digitally (three bits) controllable attenuator 502 and a digitally (four bits) controllable phase shifter 504 as previously described in connection with FIG. 1. Each channel 501 consists of a three bit attenuator 502 and four bit phase shifter. Each three bit attenuator 502 has 0.5, 1 and 2 dB bits. Each four bit phase shifter 504 has 22.5°, 45°, 90° and 180° phase bits. Each chip 500 also includes a serial to parallel converter 507 for converting a serial twenty-eight bit stream to parallel bits for controlling the attenuators and phase shifters. The attenuators facilitate proper signal balancing and tapering for a phased array antenna to reduce side lobes. The scan chip 500 controls the scan angle of the receiver as described in connection with FIG. 1 and enables the receiver to receive signals with different scan angles.

The serial to parallel converter 507 on each chip 500 is preferably implemented using GaAs technology to enable the integration of digital and RF circuitry on the chip. This integration facilitates the ability to minimize the space requirements of the overall substrate assembly. Moreover, since the operating frequency of an active array antenna is determined by the spacing between radiator elements, the minimization of size permits the realization of improved high frequency electrical performance.

The scan substrate 108 is attached to an aluminum-graphite frame 105 using film epoxy 113 and connected to the circular/linear polarization substrate 107 via Fuzz-button interconnections 111.

The regulator substrate 109 is located below the scan substrate 108. This multilayer LTCC substrate 109 contains four sixteen-way combiners 602 that combine the output signals from the sixteen scan chips 500. The regulator substrate 109 also contains regulator chips 604 for providing DC signals for the various chips in assembly 100 and for switches 606 for turning the chips on and off. The regulator substrate 109 has a multi-pin connector for delivering DC and digital signals, capacitors for DC and digital filtering, and four GPO connectors for bringing RF signals out of the substrate assembly 100. This substrate 109 is attached to an aluminum-graphite frame 110 using film epoxy 113. The multiple substrate frames 111 are fastened together using screws 114, 115 or by any suitable alternative fastening system.

The four output signals from each of the sixteen scan chips 500 on substrate 108 are connected via combiners 602 to the four bandpass filters 800 that are respectively tuned to f1, f2, f3, f4. The filters 800 are preferably installed outside of the substrate assembly 100.

From the foregoing, it should now be clear that an apparatus has been described enabling a receiver to simultaneously receive multiple independent RF input signals which can have different polarizations and different scan angles. Although a preferred embodiment has been described in detail, it should be appreciated that many variations and modifications will occur to those skilled in the art which fall within the spirit of the invention and intended scope of the appended claims.

What is claimed is:

1. An RF receiver capable of simultaneously receiving multiple independent RF input signals, each signal being characterized by a certain scan angle and a certain circular or linear polarization, said receiver comprising:

a first radiator responsive to incident RF signal energy for producing a composite signal $RF_X$;

a second radiator orthogonal to said first radiator responsive to incident RF signal energy for producing a composite signal $RF_Y$;

means dividing said composite signal $RF_X$ into multiple component $RF_X$ signals;

means dividing said composite signal $RF_Y$ into multiple component $RF_Y$ signals;

polarization compensation means including multiple processing channels, each processing channel configured to uniquely pair one of said component $RF_X$ signals with one of said component $RF_Y$ signals, each of said processing channels including 90° and 180° phase shifters controllable to phase align a pair of said $RF_X$ and $RF_Y$ component signals to produce a coherent channel output signal; and scan angle compensation means for processing said multiple coherent channel output signals to recover said multiple input signals, said scan angle compensation means including means for selectively phase shifting each of said coherent channel output signals.

2. The receiver of claim 1 wherein each of said processing channels includes a first branch for processing an $RF_X$ component signal comprising a digitally controllable 90° phase shifter and a second branch for processing an $RF_Y$ component signal comprising a digitally controllable 180° phase shifter.

3. The receiver of claim 2 wherein said 90° and 180° phase shifters are controlled in the following manner:

| POLARITY | 90° shifter | 180° shifter |
|---|---|---|
| Right Hand Circular | ON | OFF |
| Left Hand Circular | ON | ON |
| Linear 0°–90°/180°–270° | OFF | OFF |
| Linear 90°–180°/270°–360° | OFF | ON |

4. The receiver of claim 2 including means for combining processed component signals produced by said first and second branches to produce said coherent signal.

5. The receiver of claim 1 wherein said scan angle compensation means includes multiple processing channels; and a digitally controlled variable phase shifter in each of said processing channels.

6. The receiver of claim 5 wherein each of said processing channels further includes a digitally controlled variable attenuator.

7. The receiver of claim 1 wherein said polarized compensation means is implemented by one or more electronic polarization chips and said scan angle compensation means is implemented by one or more scan chips;

a first planar substrate mounting said polarization chips;

a second planar substrate mounting said scan chips; and wherein said first and second substrates are stacked on one another and electrically interconnected within the peripheral boundary of said substrates.

8. The receiver of claim 7 further including:

a first planar frame mounting said first substrate;

a second planar frame mounting said second substrate; and means fastening said frames together to form a stack of substrates.

9. An RF receiver capable of simultaneously receiving N independent RF input signals, each signal being characterized by a certain scan angle and a certain circular or linear polarization, said receiver comprising:

a first radiator responsive to incident RF signal energy for producing a composite signal $RF_X$;

a second radiator orthogonal to said first radiator responsive to incident RF signal energy for producing a composite signal $RF_Y$;

a polarization compensation stage including N branch pairs, each branch pair including a 90° phase shift branch and a 180° phase shift branch;

polarization control means for selectively enabling or disabling each of said 90° phase shift branches and each of said 180° phase shift branches;

signal divider means applying substantially equal components of said signal $RF_X$ to said N 90° phase shift branches to cause each branch to produce an $RF_X$ output component;

signal divider means applying substantially equal components of said signal $RF_Y$ to said N 180° phase shift branches to cause each branch to produce an $RF_Y$ output component;

means for summing the $RF_X$ and $RF_Y$ output components for each branch pair to produce a coherent output signal;

a scan angle compensation stage including N channels, each channel including a variable phase shifter;

means applying each coherent output signal to a different one of said N channels; and scan angle control means for selectively varying said N channel phase shifters in accordance with said certain scan angles of said N independent input signals.

10. The receiver of claim 9 wherein said 90° phase shift branches and said 180° phase shift branches are digitally controllable; and wherein said polarization control means provides digital control signals for controlling each of said branch pains.

11. The receiver of claim 10 wherein each branch pair is controlled as follows:

| POLARITY | 90° shifter | 180° shifter |
|---|---|---|
| Right Hand Circular | ON | OFF |
| Left Hand Circular | ON | ON |
| Linear 0°–90°/180°–270° | OFF | OFF |
| Linear 90°–180°/270°–360° | OFF | ON |

12. The receiver of claim 9 wherein each of said N channels includes a variable attenuator.

13. The receiver of claim 12 wherein each of said variable phase shifters and each of said variable attenuators is digitally controllable; and wherein said scan angle control means provides digital control signals to said phase shifters and attenuators.

14. The receiver of claim 9 further including a first planar substrate;

means mounting said polarization compensation stage on said first substrate;

a second planar substrate; and means mounting said scan angle compensation stage on said second planar substrate.

15. The receiver of claim 14 further including means for fastening said first and second planar substrates together to form a stack.

16. The receiver of claim 15 further including means forming electrical interconnections between stacked substrates.

17. The receiver of claim 16 wherein said electrical interconnections handle RF signals, digital control signals and DC power.

18. A method of simultaneously receiving N independent RF input signals where each signal is characterized by a certain scan angle and a certain circular or linear polarization, said method comprising:

responding to incident signal energy relative to a first plane for producing a composite signal $RF_X$;

responding to incident signal energy relative to a second plane orthogonal to said first plane for producing a composite signal $RF_Y$;

dividing said composite signal $RF_X$ into N components;

dividing said composite signal $RF_Y$ into N components;

uniquely pairing each of said $RF_X$ components with one of said $RF_Y$ components;

processing each of said N pairs of $RF_X$ and $RF_Y$ components to compensate for known polarization to produce a coherent output $RF_{XY}$ for each pair; and processing each of said N coherent outputs to compensate for known scan angle deviation to recover said N input signals.

19. The method of claim 18 wherein said step of processing each of said N pairs includes selectively phase shifting said $RF_X$ components by 90° and selectively phase shifting said $RF_Y$ components by 180° to produce a coherent output.

20. The method of claim 18 wherein said step of processing said coherent outputs includes variably phase shifting each of said coherent outputs to compensate for known scan angle deviation.

* * * * *